US011701984B2

(12) United States Patent
Lee et al.

(10) Patent No.: US 11,701,984 B2
(45) Date of Patent: Jul. 18, 2023

(54) APPARATUS AND METHOD FOR CONTROLLING INTERIOR OF VEHICLE

(71) Applicant: LG ELECTRONICS INC., Seoul (KR)

(72) Inventors: Chul Hee Lee, Bucheon-si (KR); Jun Young Jung, Seoul (KR); Sangkyeong Jeong, Seoul (KR); Kibong Song, Seoul (KR); Hyunkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 711 days.

(21) Appl. No.: 16/801,574

(22) Filed: Feb. 26, 2020

(65) Prior Publication Data
US 2021/0155122 A1 May 27, 2021

(30) Foreign Application Priority Data

Nov. 26, 2019 (KR) .......................... 10-2019-0153590

(51) Int. Cl.
*B60N 2/02* (2006.01)
*G06V 20/59* (2022.01)
(Continued)

(52) U.S. Cl.
CPC .............. *B60N 2/0244* (2013.01); *B60N 2/14* (2013.01); *B60N 2/763* (2018.02); *G06V 10/764* (2022.01);
(Continued)

(58) Field of Classification Search
CPC ........ B60N 2/002; B60N 2/01; B60N 2/0224; B60N 2/0244; B60R 11/04; B60R 11/0247; B60W 60/0016; G06V 20/59
(Continued)

(56) References Cited

U.S. PATENT DOCUMENTS 7,934,763 B2 * 5/2011 Mabuchi .............. B60N 2/0292
297/344.21
10,809,720 B2 * 10/2020 Li .......................... B60N 2/002
(Continued)

FOREIGN PATENT DOCUMENTS

WO    WO-2021013729 A1 *   1/2021   ......... B60N 2/01516

OTHER PUBLICATIONS

English translation of W) 2021/013729; retrieved via PatentTranslate located at www.epo.org. (Year: 2022).*

*Primary Examiner* — Jason S Daniels
(74) *Attorney, Agent, or Firm* — Birch, Stewart, Kolasch & Birch, LLP

(57) ABSTRACT

An apparatus and a method for controlling an interior of a vehicle are disclosed. The apparatus for controlling the interior of the vehicle may include an interface configured to receive, at predetermined cycles, information on at least one of video of an inside of the vehicle collected by a camera or sound of the inside of the vehicle collected from a microphone, and a processor configured to determine a relationship between passengers in the vehicle based on the information, and control the interior of the vehicle based on the relationship between the passengers. When determining the relationship between passengers, a passenger relationship estimation algorithm used may be a neural network model generated through machine learning, and may be stored in a memory in the apparatus for controlling the interior of the vehicle, or may be provided via a server in an artificial intelligence environment through a 5G network.

19 Claims, 9 Drawing Sheets

(51) Int. Cl.
  *B60N 2/14* (2006.01)
  *B60N 2/75* (2018.01)
  *G08B 21/24* (2006.01)
  *G06V 10/764* (2022.01)
  *G06V 10/82* (2022.01)
  *B60R 11/02* (2006.01)
  *B60R 11/04* (2006.01)
  *B60R 11/00* (2006.01)

(52) U.S. Cl.
  CPC .............. *G06V 10/82* (2022.01); *G06V 20/59* (2022.01); *G08B 21/24* (2013.01); *B60N 2002/0268* (2013.01); *B60R 11/0247* (2013.01); *B60R 11/04* (2013.01); *B60R 2011/0003* (2013.01)

(58) Field of Classification Search
  USPC .................................................. 296/64, 65.01
  See application file for complete search history.

(56) References Cited

U.S. PATENT DOCUMENTS

| | | | |
|---|---|---|---|
| 11,254,284 B2* | 2/2022 | Sung | B60N 2/002 |
| 2007/0290554 A1* | 12/2007 | Teshima | B60N 2/0244 |
| | | | 296/64 |
| 2021/0146957 A1* | 5/2021 | Kim | B60W 60/00253 |

* cited by examiner

APPARATUS AND METHOD FOR CONTROLLING INTERIOR OF VEHICLE

CROSS-REFERENCE TO RELATED APPLICATION

This present application claims benefit of priority to Korean Patent Application No. 10-2019-0153590, entitled "APPARATUS AND METHOD FOR CONTROLLING INTERIOR OF VEHICLE Title of the Invention," filed on Nov. 26, 2019, in the Korean Intellectual Property Office, the entire disclosure of which is incorporated herein by reference.

BACKGROUND

Field of the Invention

The present disclosure relates to an apparatus and a method for controlling an interior of a vehicle, which controls the interior of the vehicle based on a relationship between passengers in the vehicle.

Description of Related Art

Vehicles are an important means of transportation, which are being developed to improve performance for a more comfortable ride, change the structure of seats, and provide various functions (for example, a content providing function, or an autonomous driving-related function).

Seats in such vehicles (or backrests and armrests of the seats) are being manufactured to be variously adjustable in position or direction in order for passengers to be seated more comfortably. A passenger of a seat in the vehicle may increase his or her comfort by adjusting the position or direction of the seat, but by doing so may unintentionally cause discomfort for other adjacent passengers.

Therefore, there is a need for a technology that, when the passenger of the seat in the vehicle adjusts the seat, causes the seat to be adjusted within a movement allowance range based on a relationship between passengers, which enables all passengers in the vehicle to use the vehicle comfortably without feeling discomfort.

SUMMARY OF THE INVENTION

Embodiments of the present disclosure are directed to controlling an interior in a vehicle (for example, seats, armrests, or backrests of the seats) based on a relationship between passengers in the vehicle, thereby enabling all passengers to use the vehicle comfortably without feeling inconvenience due to other passengers.

Embodiments of the present disclosure are directed to determining a movement allowance range for an interior in a vehicle differently according to a relationship between passengers in the vehicle, and allowing adjustment of the interior in the vehicle within the determined movement allowance range, thereby effectively utilizing the space in the vehicle according to the relationship between the passengers, such that the passengers may feel more comfortable.

Embodiments of the present disclosure are directed to, based on a relationship between passengers in a vehicle, providing video content and audio related to the video content to each passenger individually, or providing the content to the passengers together, such that the passengers may individually focus on and use different contents desired by the passengers, or share and enjoy the same content desired by the passengers together.

In addition, embodiments of the present disclosure are directed to checking whether there is a risk of theft of an item in a vehicle based on a relationship between passengers in the vehicle, and in response to checking that there is a risk of theft of the item, providing a risk warning message for the item to a passenger who is the owner of the item in various ways (for example, sending a message to a mobile terminal, or generating vibration in a seat), thereby preventing theft of the item.

In one embodiment of the present disclosure, an apparatus for controlling an interior of a vehicle is provided, comprising: an interface configured to receive, at predetermined cycles, at information on least one of video of an inside of the vehicle collected by a camera installed in the vehicle or sound of the inside of the vehicle collected from a microphone installed in the vehicle, and a processor configured to determine a relationship between passengers in the vehicle based on the information received at predetermined cycles, and control the interior of the vehicle based on the determined relationship between the passengers.

In another embodiment of the present disclosure, a method for controlling an interior of a vehicle is provided, comprising: receiving, at predetermined cycles, information on at least one of video of an inside of the vehicle collected by a camera installed in the vehicle or sound of the inside of the vehicle collected from a microphone installed in the vehicle, and determining a relationship between passengers in the vehicle based on the information received at predetermined cycles, and controlling the interior of the vehicle based on the determined relationship between the passengers.

Apart from those described above, another method and another system for implementing the present disclosure, and a computer-readable recording medium having a computer program stored therein to perform the method may be further provided.

Other aspects and features in addition to those described above will become clear from the accompanying drawings, claims, and the detailed description of the present disclosure.

According to the present disclosure, an interior in a vehicle (for example, seats, armrests, or backrests of the seats) is controlled based on a relationship between passengers in the vehicle, thereby enabling all passengers to use the vehicle comfortably without feeling inconvenience due to other passengers.

According to the present disclosure, a movement allowance range for an interior in a vehicle is determined differently according to a relationship between passengers in the vehicle, and adjustment of the interior in the vehicle is allowed within the determined movement allowance range, thereby effectively utilizing the space in the vehicle according to the relationship between the passengers, such that the passengers may feel more comfortable.

According to the present disclosure, based on a relationship between passengers in a vehicle, video content and audio related to the video content are provided to each passenger individually or are provided to the passengers together, such that the passengers may individually focus on and use different contents desired by the passengers, or share and enjoy the same content desired by the passengers together.

In addition, according to the present disclosure, whether there is a risk of theft of an item in a vehicle is checked based on a relationship between passengers in the vehicle, and in response to checking that there is a risk of theft of the item, a risk warning message for the item is provided to a passenger who is the owner of the item in various ways (for example, sending a message to a mobile terminal, or generating vibration in a seat), thereby preventing theft of the item.

DETAILED DESCRIPTION

Figure 1:
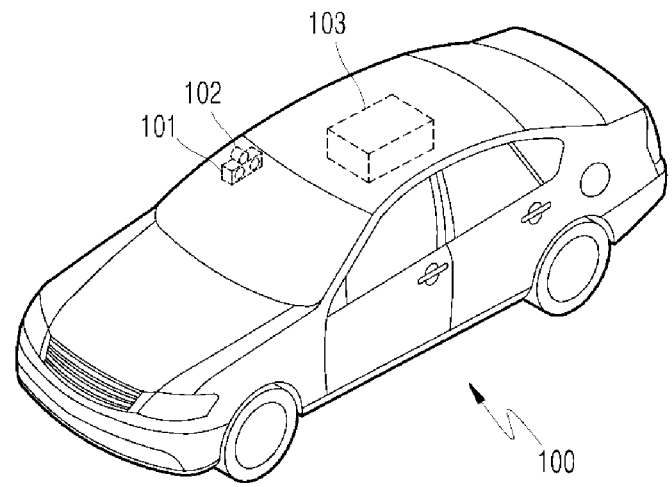
FIG. 1 is a view illustrating a vehicle to which an apparatus for controlling an interior of a vehicle according to an embodiment of the present disclosure is applied.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In the following description of the embodiments disclosed herein, the detailed description of related known technology will be omitted when it may obscure the subject matter of the embodiments according to the present disclosure. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

As used herein, the singular forms "a," "an," and "the" are intended to include the plural forms as well, unless the context clearly indicates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

The vehicle described in the present disclosure may include, but is not limited to, a vehicle having an internal combustion engine as a power source, a hybrid vehicle having an engine and an electric motor as a power source, and an electric vehicle having an electric motor as a power source.

FIG. 1 is a view illustrating a vehicle to which an apparatus for controlling an interior of a vehicle according to an embodiment of the present disclosure is applied.

Referring to FIG. 1, in a vehicle 100 to which an apparatus for controlling an interior of a vehicle is applied, for example, one or more cameras 101 and a microphone 102 may be installed at different locations. Here, the camera 101 may capture and collect video of the inside of the vehicle 100 at predetermined cycles, and the microphone 102 may also receive and collect sound of the inside of the vehicle 100 at predetermined cycles.

An apparatus for controlling an interior of a vehicle 103 may be included in the vehicle 100, and may determine a relationship between passengers in the vehicle 100 based on the video and sound of the inside of the vehicle 100 collected at predetermined cycles, and control the interior of the vehicle based on the determined relationship between the passengers. Here, the apparatus for controlling the interior of the vehicle 103 may set a certain range as a personal space of a passenger seated in a seat, based on the initially designated position of the seat, and adjust the personal spaces of passengers according to a relationship between the passengers seated in the seats, thereby determining a shared space in addition to the personal space. The apparatus for controlling the interior of the vehicle 103 determines a movement allowance range of a seat in the vehicle 100 and components attached to the seat based on the personal space and the shared space, and adjusts the seat and the components attached to the seat within the determined movement allowance range, so that the passengers do not feel uncomfortable.

Figure 2:
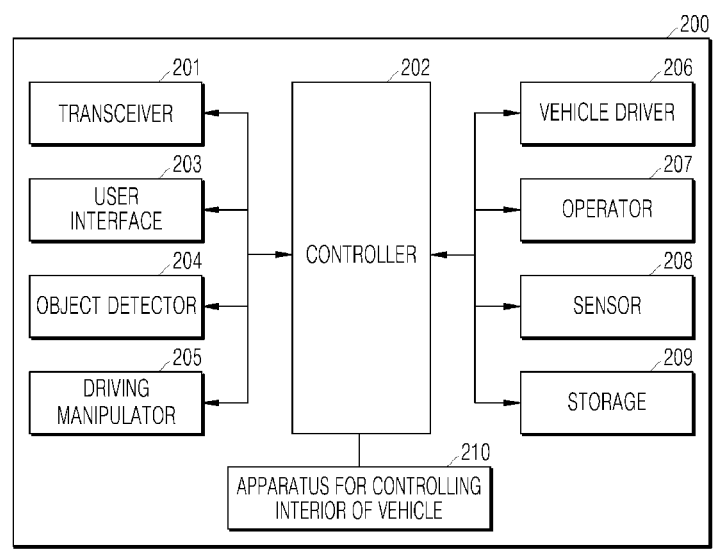
FIG. 2 is a block diagram illustrating a system to which an apparatus for controlling an interior of a vehicle according to an embodiment of the present disclosure is applied.

FIG. 2 is a block diagram illustrating a system to which an apparatus for controlling an interior of a vehicle according to an embodiment of the present disclosure is applied.

Referring to FIG. 2, a system 200 to which the apparatus for controlling the interior of the vehicle is applied may be included in the vehicle 100 and may include a transceiver 201, a controller 202, a user interface 203, an object detector 204, a driving manipulator 205, a vehicle driver 206, an operator 207, a sensor 208, a storage 209, and an apparatus for controlling an interior of a vehicle 210.

Depending on the embodiment, the system to which the apparatus for controlling the interior of the vehicle is applied may include constituent elements other than the constituent elements shown and described in FIG. 2, or may not include some of the constituent elements shown and described in FIG. 2.

The vehicle 100 may be switched from an autonomous mode to a manual mode, or switched from the manual mode to the autonomous mode depending on the driving situation. Here, the driving situation may be judged by at least one of the information received by the transceiver 201, the external object information detected by the object detector 204, or the navigation information acquired by the navigation module.

The vehicle 100 may be switched from the autonomous mode to the manual mode, or from the manual mode to the autonomous mode, according to a user input received through the user interface 203.

When the vehicle 100 is operated in the autonomous driving mode, the vehicle 100 may be operated under the control of the operator 207 that controls driving, parking, and unparking. When the vehicle 100 is operated in the manual mode, the vehicle 100 may be operated by an input of the driver's mechanical driving operation.

The transceiver 201 is a module for performing communication with an external device. Here, the external device may be a user terminal, another vehicle, or a server.

The transceiver 201 may include at least one of a transmission antenna, a reception antenna, a radio frequency (RF) circuit capable of implementing various communication protocols, or an RF element in order to perform communication.

The transceiver 201 may perform short range communication, GPS signal reception, V2X communication, optical communication, broadcast transmission/reception, and intelligent transport systems (ITS) communication functions.

The transceiver 201 may further support other functions than the functions described, or may not support some of the functions described, depending on the embodiment.

The transceiver 201 may support short-range communication by using at least one of Bluetooth, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB) technologies.

The transceiver 201 may form short-range wireless communication networks so as to perform short-range communication between the vehicle 100 and at least one external device.

The transceiver 201 may include a Global Positioning System (GPS) module or a Differential Global Positioning System (DGPS) module for acquiring location information of the vehicle 100.

The transceiver 201 may include a module for supporting wireless communication between the vehicle 100 and a server (V2I: vehicle to infrastructure), between the vehicle 100 and another vehicle (V2V: vehicle to vehicle), or between the vehicle 100 and a pedestrian (V2P: vehicle to pedestrian). That is, the transceiver 201 may include a V2X communication module. The V2X communication module may include an RF circuit capable of implementing V2I, V2V, and V2P communication protocols.

The transceiver 201 may receive a danger information broadcast signal transmitted by another vehicle through the V2X communication module, and may transmit a danger information inquiry signal and receive a danger information response signal in response thereto.

The transceiver 201 may include an optical communication module for communicating with an external device via light. The optical communication module may include a light transmitting module for converting an electrical signal into an optical signal and transmitting the optical signal to the outside, and a light receiving module for converting the received optical signal into an electrical signal.

Depending on the embodiment, the light transmitting module may be formed to be integrated with the lamp included in the vehicle 100.

The transceiver 201 may include a broadcast communication module for receiving broadcast signals from an external broadcast management server, or transmitting broadcast signals to the broadcast management server through broadcast channels. The broadcast channel may include a satellite channel and a terrestrial channel. Examples of the broadcast signal may include a TV broadcast signal, a radio broadcast signal, and a data broadcast signal.

The transceiver 201 may include an ITS communication module that exchanges information, data or signals with a traffic system. The ITS communication module may provide the acquired information and data to the traffic system. The ITS communication module may receive information, data, or signals from the traffic system. For example, the ITS communication module may receive road traffic information from the traffic system, and provide the information to the controller 202. For example, the ITS communication module may receive a control signal from the traffic system, and provide the control signal to the controller 202 or a processor provided in the vehicle 100.

Depending on the embodiment, the overall operation of each module of the transceiver 201 may be controlled by a separate processor provided in the transceiver 201. The transceiver 201 may include a plurality of processors, or may not include a processor. When the transceiver 201 does not include a processor, the transceiver 201 may be operated under the control of the processor of another device in the vehicle 100 or the controller 202.

The transceiver 201 may implement a vehicle display device together with the user interface 203. In this case, the vehicle display device may be referred to as a telematics device or an audio video navigation (AVN).

Figure 3:
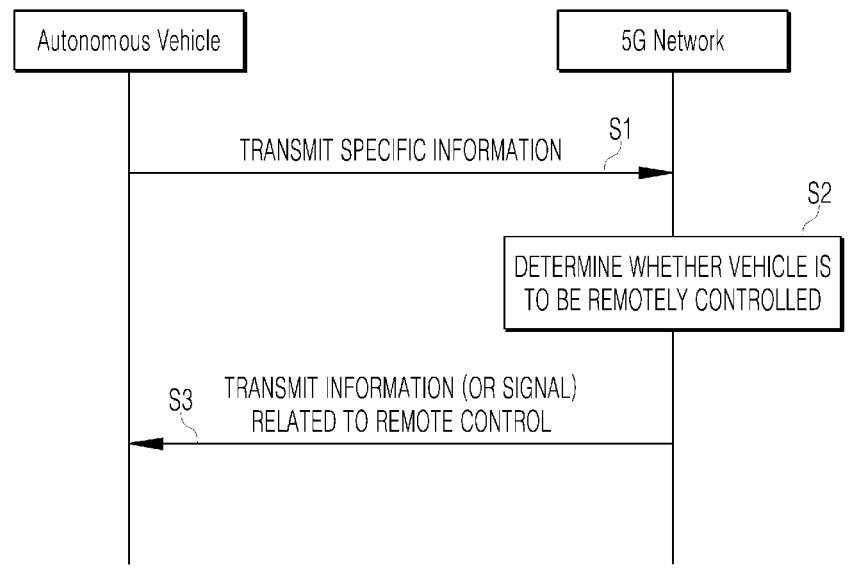
FIG. 3 is a view illustrating an example of a basic operation of an autonomous vehicle and a 5G network in a 5G communication system.

FIG. 3 is a view illustrating one example of a basic operation of an autonomous vehicle and a 5G network in a 5G communication system.

The transceiver 201 may transmit specific information to the 5G network when the vehicle 100 is operated in the autonomous mode (S1).

Here, the specific information may include autonomous driving related information.

The autonomous driving related information may be information directly related to the driving control of the vehicle. For example, the autonomous driving related information may include at least one of object data indicating an object around the vehicle, map data, vehicle state data, vehicle position data, or driving plan data.

The autonomous driving related information may further include service information necessary for autonomous driving. For example, the specific information may include information about the destination and the safety level of the vehicle, which are inputted through the user interface 203.

In addition, the 5G network may determine whether the vehicle is to be remotely controlled (S2).

Here, the 5G network may include a server or a module which performs remote control related to autonomous driving.

The 5G network may transmit information (or a signal) related to the remote control to an autonomous vehicle (S3).

As described above, the information related to the remote control may be a signal directly applied to the autonomous vehicle, and may further include service information necessary for autonomous driving. The autonomous vehicle according to one embodiment of the present disclosure may receive service information such as insurance for each interval selected on a driving route and risk interval information, through a server connected to the 5G network to provide services related to the autonomous driving.

The vehicle 100 is connected to an external server through a communication network, and is capable of moving along a predetermined route without driver intervention using the autonomous driving technology.

In the following embodiments, the user may be interpreted as a driver, a passenger, or the owner of a user terminal.

When the vehicle 100 is traveling in the autonomous mode, the type and frequency of accidents may vary greatly depending on the ability to sense the surrounding risk factors in real time. The route to the destination may include sections having different levels of risk due to various causes such as weather, terrain characteristics, traffic congestion, and the like.

At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 100 may operate in association with at least one AI module or robot included in the vehicle 100, during autonomous driving.

For example, the vehicle 100 may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 100 to a final destination. For example, the robot may perform a function of providing route guidance to a final destination to a user who alights from the vehicle 100. For example, the robot may perform a function of transporting the user who alights from the vehicle 100 to the final destination At least one electronic apparatus included in the vehicle 100 may communicate with the robot through a communication device.

At least one electronic apparatus included in the vehicle 100 may provide, to the robot, data processed by the at least one electronic apparatus included in the vehicle 100. For example, at least one electronic apparatus included in the vehicle 100 may provide, to the robot, at least one among object data indicating an object near the vehicle, HD map data, vehicle state data, vehicle position data, and driving plan data.

At least one electronic apparatus included in the vehicle 100 may receive, from the robot, data processed by the robot. At least one electronic apparatus included in the vehicle 100 may receive at least one among sensing data sensed by the robot, object data, robot state data, robot location data, and robot movement plan data.

At least one electronic apparatus included in the vehicle 100 may generate a control signal based on data received from the robot. For example, at least one electronic apparatus included in the vehicle may compare the information about the object generated by the object detector with the information about the object generated by the robot, and generate a control signal based on the comparison result. At least one electronic apparatus included in the vehicle 100 may generate a control signal so as to prevent interference between the route of the vehicle and the route of the robot.

At least one electronic apparatus included in the vehicle 100 may include a software module or a hardware module for implementing an artificial intelligence (AI) (hereinafter referred to as an artificial intelligence module). At least one electronic apparatus included in the vehicle may input the acquired data to the AI module, and use the data which is outputted from the AI module.

The artificial intelligence module may perform machine learning of input data by using at least one artificial neural network (ANN). The artificial intelligence module may output driving plan data through machine learning of input data.

At least one electronic apparatus included in the vehicle 100 may generate a control signal based on the data outputted from the artificial intelligence module.

According to the embodiment, at least one electronic apparatus included in the vehicle 100 may receive data processed by an artificial intelligence from an external device through a communication device. At least one electronic apparatus included in the vehicle 100 may generate a control signal based on data processed by artificial intelligence.

Artificial intelligence (AI) is a field of computer engineering science and information technology that studies methods to make computers mimic intelligent human behaviors such as reasoning, learning, self-improving, and the like.

In addition, AI does not exist on its own, but is rather directly or indirectly related to a number of other fields in computer science. Particularly in recent years, there have been numerous attempts to introduce an element of AI into various fields of information technology to solve problems of the respective fields.

The controller 202 may be implemented by using at least one of an application specific integrated circuit (ASIC), a digital signal processor (DSP), a digital signal processing device (DSP), a programmable logic device (PLD), a field programmable gate array (FPGA), a processor, a controller, a micro-controller, a microprocessor, or other electronic units for performing other functions.

The user interface 203 is for communication between the vehicle 100 and the vehicle user, and may receive an input signal of the user, transmit the received input signal to the controller 202, and provide information held by the vehicle 100 to the user by the control of the controller 202. The user interface 203 may include, but is not limited to, an input module, an internal camera, a bio-sensing module, and an output module.

The input module is for receiving information from a user. The data collected by the input module may be identified by the controller 202 and processed by the user's control command.

The input module may receive the destination of the vehicle 100 from the user and provide the destination to the controller 202.

The input module may input to the controller 202 a signal for designating and deactivating at least one of the plurality of sensor modules of the object detector 204 according to the user's input.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or a video.

The output module may include at least one of a display module, an acoustic output module, and a haptic output module.

The display module may display graphic objects corresponding to various information.

The display module may include at least one of a liquid crystal display (LCD), a thin film transistor liquid crystal display (TFT LCD), an organic light emitting diode (OLED), a flexible display, a 3D display, or an e-ink display.

The display module may form an interactive layer structure with a touch input module, or may be integrally formed with the touch input module to implement a touch screen.

The display module may be implemented as a head up display (HUD). When the display module is implemented as an HUD, the display module may include a project module, and output information through a video projected onto a windshield or a window.

The display module may include a transparent display. The transparent display may be attached to the windshield or the window.

The transparent display may display a predetermined screen with a predetermined transparency. To have the transparency, the transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The user interface 203 may include a plurality of display modules.

The display module may be disposed on one area of a steering wheel, one area of an instrument panel, one area of a seat, one area of each pillar, one area of a door, one area of a center console, one area of a head lining, or one area of a sun visor, or may be implemented on one area of a windshield or one area of a window.

The sound output module may convert an electric signal provided from the controller 202 into an audio signal, and output the audio signal. To this end, the sound output module may include at least one speaker.

The haptic output module may generate a tactile output. For example, the haptic output module may operate to allow the user to perceive the output by vibrating a steering wheel, a seat belt, and a seat.

The object detector 204 is for detecting an object located outside the vehicle 100. The object detector 204 may generate object information based on the sensing data, and transmit the generated object information to the controller 202. Examples of the object may include various objects related to the driving of the vehicle 100, such as a lane, another vehicle, a pedestrian, a motorcycle, a traffic signal, light, a road, a structure, a speed bump, a landmark, and an animal.

The object detector 204 is a plurality of sensor modules and may include a camera module, a lidar, an ultrasonic sensor, a radar, and an IR sensor as a plurality of video capturers.

The object detector 204 may sense environmental information around the vehicle 100 through a plurality of sensor modules.

Depending on the embodiment, the object detector 204 may further include components other than the components described, or may not include some of the components described.

The radar may include an electromagnetic wave transmitting module and an electromagnetic wave receiving module. The radar may be implemented by a pulse radar system or a continuous wave radar system in terms of the radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) scheme or a phase-shift scheme by using an electromagnetic wave as a medium, and may detect the position of the detected object, the distance to the detected object, and a relative speed of the detected object.

The radar may be disposed at an appropriate position outside the vehicle for sensing an object disposed at the front, back, or side of the vehicle.

The lidar may include a laser transmitting module and a laser receiving module. The lidar may be implemented in a TOF scheme or a phase-shift scheme.

The lidar may be embodied in a driving method or a non-driving method.

When the lidar is embodied in the driving method, the lidar may rotate by means of a motor, and detect an object near the vehicle 100. When the LiDAR is implemented in the non-driving method, the lidar may detect an object within a predetermined range with respect to the vehicle 100 by means of light steering. The vehicle 100 may include a plurality of non-driven type lidars.

The lidar may detect an object based on a TOF scheme or a phase-shift scheme by using a laser beam as a medium, and may detect the position of the detected object, the distance to the detected object, and the relative speed of the detected object.

The lidar may be disposed at an appropriate location outside the vehicle for sensing an object disposed at the front, back, or side of the vehicle.

The video capturer may be disposed at a suitable place outside the vehicle, for example, the front, back, right side mirrors and the left side mirror of the vehicle, in order to acquire a vehicle exterior video. The video capturer may be a mono camera, but is not limited thereto, and may be a stereo camera, an around view monitoring (AVM) camera, or a 360 degree camera.

The video capturer may be disposed close to the front windshield in the interior of the vehicle in order to acquire a video of the front of the vehicle. The video capturer may be disposed around the front bumper or the radiator grill.

The video capturer may be disposed close to the rear glass in the interior of the vehicle in order to acquire a video of the back of the vehicle. The video capturer may be disposed around the rear bumper, the trunk, or the tail gate.

The video capturer may be disposed close to at least one side window in the interior of the vehicle in order to acquire a video of the side of the vehicle. In addition, the video capturer may be disposed around the fender or the door.

The video capturer may provide the acquired video to the controller 202.

The ultrasonic sensor may include an ultrasonic transmission module and an ultrasonic reception module. The ultrasonic sensor may detect an object based on ultrasonic waves, and detect the position of the detected object, the distance to the detected object, and the relative speed of the detected object.

The ultrasonic sensor may be disposed at an appropriate position outside the vehicle for sensing an object at the front, back, or side of the vehicle.

The infrared sensor may include an infrared transmitting module, and an infrared receiving module. The infrared sensor may detect an object based on the infrared light, and detect the position of the detected object, the distance to the detected object, and the relative speed of the detected object.

The infrared sensor may be disposed at an appropriate position outside the vehicle for sensing an object at the front, back, or side of the vehicle.

The controller 202 may control the overall operation of the object detector 204.

The controller 202 may compare data sensed by the radar, the lidar, the ultrasonic sensor, and the infrared sensor with pre-stored data so as to detect or classify an object.

The controller 202 may detect and track objects based on the acquired video. The controller 202 may perform operations such as calculating a distance to an object and calculating a relative speed with respect to the object through a video processing algorithm.

For example, the controller 202 may acquire information on the distance to the object and information on the relative speed with respect to the object on the basis of variation of the object size with time in the acquired video.

For example, the controller 202 may acquire information on the distance to the object and information on the relative speed through, for example, a pin hole model and road surface profiling.

The controller 202 may detect and track the object based on the reflected electromagnetic wave that is reflected by the object and returned to the object after being transmitted. The controller 202 may perform operations such as calculating a distance to an object and calculating a relative speed of the object based on the electromagnetic wave.

The controller 202 may detect and track the object based on the reflected laser beam that is reflected by the object and returned to the object after being transmitted. The controller 202 may perform operations such as calculating a distance to an object and calculating a relative speed of the object based on the laser light.

The controller 202 may detect and track the object based on the reflected ultrasonic wave that is reflected by the object and returned to the object after being transmitted. The controller 202 may perform operations such as calculating a distance to an object and calculating a relative speed of the object based on the ultrasonic wave.

The controller 202 may detect and track the object based on the reflected infrared light that is reflected by the object and returned to the object after being transmitted. The controller 202 may perform operations such as calculating a distance to an object and calculating a relative speed of the object based on the infrared light.

Depending on the embodiment, the object detector 204 may include a separate processor from the controller 202. In addition, each of the radar, the lidar, the ultrasonic sensor and the infrared sensor may include a processor.

When a processor is included in the object detector 204, the object detector 204 may be operated under the control of the processor controlled by the controller 202.

The driving manipulator 205 may receive a user input for driving. In the manual mode, the vehicle 100 may operate based on the signal provided by the driving manipulator 205.

The vehicle driver 206 may electrically control the driving of various apparatuses in the vehicle 100. The vehicle driver 206 may electrically control the operations of a power train, a chassis, a door/window, a safety device, a lamp, and an air conditioner in the vehicle 100.

The operator 207 may control various operations of the vehicle 100. The operator 207 may be operated in an autonomous driving mode.

The operator 207 may include a driving module, an unparking module, and a parking module.

Depending on the embodiment, the operator 207 may further include constituent elements other than the constituent elements to be described, or may not include some of the constitute elements.

The operator 207 may include a processor under the control of the controller 202. Each module of the operator 207 may include a processor individually.

Depending on the embodiment, when the operator 207 is implemented as software, it may be a sub-concept of the controller 202.

The driving module may perform driving of the vehicle 100.

The driving module may receive object information from the object detector 204, and provide a control signal to a vehicle driving module to perform the driving of the vehicle 100.

The driving module may receive a signal from an external device through the transceiver 201, and provide a control signal to the vehicle driving module, so that the driving of the vehicle 100 may be performed.

In the unparking module, unparking of the vehicle 100 may be performed.

The unparking module may receive navigation information from the navigation module, and provide a control signal to the vehicle driving module to perform the unparking of the vehicle 100.

The unparking module may receive object information from the object detector 204 and provide a control signal to the vehicle driving module to perform the unparking of the vehicle 100.

The unparking module may receive a signal from an external device via the transceiver 201, and provide a control signal to the vehicle driving module to perform the unparking of the vehicle 100.

In the parking module, parking of the vehicle 100 may be performed.

The parking module may receive navigation information from the navigation module, and provide a control signal to the vehicle driving module to perform the parking of the vehicle 100.

The parking module may receive object information from the object detector 204, and provide a control signal to the vehicle driving module to perform the parking of the vehicle 100.

The parking module may receive a signal from an external device via the transceiver 201, and provide a control signal to the vehicle driving module so as to perform the parking of the vehicle 100.

The navigation module may provide the navigation information to the controller 202. The navigation information may include at least one of map information, set destination information, route information according to destination setting, information about various objects on the route, lane information, or current location information of the vehicle.

The navigation module may provide the controller 202 with a parking lot map of the parking lot entered by the vehicle 100. When the vehicle 100 enters the parking lot, the controller 202 may receive the parking lot map from the navigation module, and project the calculated route and fixed identification information on the provided parking lot map so as to generate the map data.

The navigation module may include a memory. The memory may store navigation information. The navigation information may be updated by information received through the transceiver 201. The navigation module may be controlled by a built-in processor, or may be operated by receiving an external signal, for example, a control signal from the controller 202, but the present disclosure is not limited to this example.

The driving module of the operator 207 may receive navigation information from the navigation module, and provide a control signal to the vehicle driving module so that driving of the vehicle 100 may be performed.

The sensor 208 may sense the state of the vehicle 100, that is, a signal related to the state of the vehicle 100 by using a sensor mounted on the vehicle 100, and acquire movement route information of the vehicle 100 according to the sensed signal. The sensor 208 may provide the acquired movement route information to the controller 202.

The sensor 208 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor, but is not limited thereto.

The sensor 208 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 208 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), but is not limited thereto.

The sensor 208 may generate vehicle state information based on sensing data. The vehicle state information may be information generated based on data sensed by various sensors provided in the vehicle.

The vehicle state information may include at least one among posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal position information, and vehicle engine temperature information.

The storage 209 is electrically connected to the controller 202. The storage 209 may store basic data on each unit of the apparatus for controlling the interior of the vehicle 210, control data for controlling the operation of each unit of the apparatus for controlling the interior of the vehicle 210, and input/output data. The storage 209 may be various storage devices such as a ROM, a RAM, an EPROM, a flash drive, and a hard drive, in terms of hardware. The storage 209 may store various data for overall operation of the vehicle 100, such as a program for processing or controlling the controller 202, in particular driver propensity information. Here, the storage 209 may be formed integrally with the controller 202 or may be implemented as a sub-component of the controller 202.

The apparatus for controlling the interior of the vehicle 210 may determine a relationship between passengers in the vehicle 100 based on the video and sound collected respectively from the camera and the microphone installed inside the vehicle 100, and control the interior of the vehicle based on the determined relationship between the passengers.

The apparatus for controlling the interior of the vehicle 210 may include an interface, a processor, and a memory, which will be described in more detail below with reference to FIG. 4. Here, the interface may be included in, for example, the transceiver 201, the processor may be included in the controller 202, and the memory may be included in the storage 209.

Figure 4:
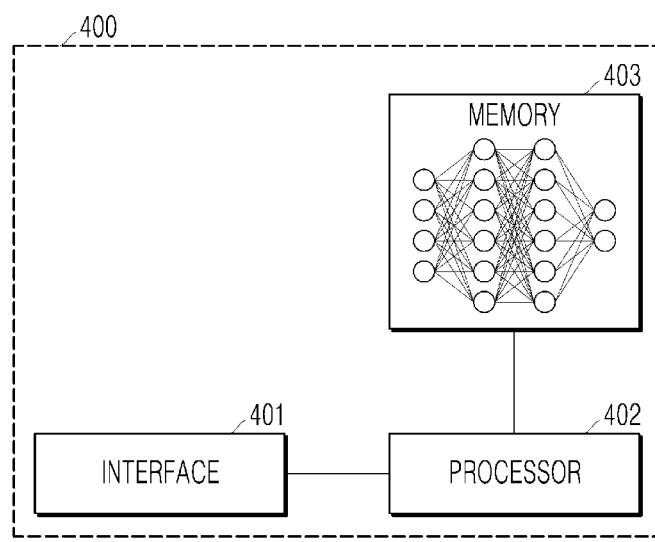
FIG. 4 is a view illustrating an example for a configuration of an apparatus for controlling an interior of a vehicle according to one embodiment of the present disclosure.

FIG. 4 is a view illustrating an example for a configuration of an apparatus for controlling an interior of a vehicle according to one embodiment of the present disclosure.

Referring to FIG. 4, an apparatus for controlling an interior of a vehicle 400 according to one embodiment of the present disclosure may include an interface 401, a processor 402, and a memory 403.

The interface 401 may receive, at predetermined cycles, information on at least one of video of the inside of the vehicle collected by a camera installed in the vehicle or sound of the inside of the vehicle collected from a microphone installed in the vehicle.

In addition, the interface 401 may receive a subscriber list regarding a vehicle from a server (not shown) and store the list in the memory 403. When the server receives a vehicle reservation request from a mobile terminal (for example, a smartphone or a tablet PC) owned by a prospective passenger, the server may reserve the vehicle for the prospective passenger. Here, the server may receive information on the prospective passenger from the mobile terminal, and generate the subscriber list based on the information on the prospective passenger. Here, the information on the prospective passenger may include, for example, personal information of the prospective passenger (for example, name, and phone number of the mobile terminal), and boarding information (for example, vehicle identification information, reservation time, number of seats, seat number, payment method, presence or absence of a fellow passenger, and relationship with fellow passenger). In response to a subscriber request from the apparatus for controlling the interior of the vehicle 400, the server may provide the apparatus 400 with the subscriber list corresponding to the vehicle including the apparatus 400.

The processor 402 may generate a passenger list and store the passenger list in the memory 403. Specifically, the processor 402 may recognize both a passenger and an item owned by the passenger, based on the information on at least one of video of the inside of the vehicle or sound of the inside of the vehicle, which is received at predetermined cycles when passengers have boarded the vehicle. Here, the processor 402 may assign a passenger ID and an item ID to the passenger and the item owned by the passenger, respectively, generate the passenger list by matching the assigned passenger ID and the item ID, and store the generated passenger list in memory 403. Here, when a subscriber list is pre-stored in the memory 403, the processor 402 may update the passenger list based on the subscriber list. For example, the processor 402 may update the passenger list with, for example, identification information of the mobile terminal owned by a prospective passenger in the subscriber list, a seat number, a reservation time, and a relationship with a fellow passenger.

The processor 402 may adjust a seat in the vehicle and components attached to the seat (for example, armrests and backrests) at the command of the passenger, and limit the degree of adjustment by only allowing movement within a movement allowance range based on the relationship between passengers.

Specifically, the processor 402 may determine a relationship between passengers in the vehicle based on the information on at least one of video of the inside of the vehicle or sound of the inside of the vehicle, which is received at predetermined cycles, and control the interior of the vehicle based on the determined relationship between the passengers. Here, the processor 402 may control the interior of the vehicle by adjusting the respective seats in which the passengers are seated and components attached to the seats, based on the determined relationship between the passengers. Specifically, the processor 402 may determine a movement allowance range for at least one of the position of the seat of the passenger, the rotation of the seat, the adjustment of the backrest of the seat, or the adjustment of the armrest of the seat, and control the interior of the vehicle by adjusting at least one of the seat, the backrest of the seat, or the armrest of the seat based on the movement allowance range.

When determining the relationship between the passengers, the processor 402 may determine the relationship between the passengers by applying a passenger relationship estimation algorithm to the information on at least one of video of the inside of the vehicle or sound of the inside of the vehicle, or may determine the relationship between the passengers according to a predetermined relationship criterion (for example, words (appellations) in speech from which a relationship can be inferred, tone (or intonation), gestures related to behavior (for example, physical contact), gaze (for example, eye contact frequency), expression, whether an object is shared, and sitting posture) based on the information. Here, the passenger relationship estimation algorithm may be a neural network model trained to estimate a relationship between a plurality of people based on the predetermined relationship criterion, from information on at least one of motion or conversation sound between the people. The passenger relationship estimation algorithm may be generated in advance by the apparatus for controlling the interior of the vehicle 400 and pre-stored in the memory 403, or may be provided from the server through a 5G network and received by the interface 401, and stored in the memory 403.

Specifically, the processor 402 may determine any one of a plurality of relationships according to intimacy. Here, the plurality of relationships may be, for example, any one of a lower relationship having the lowest level of intimacy (for example, a stranger relationship), an upper relationship having the highest level of intimacy (for example, a couple or family relationship), or an intermediate relationship other than the lower relationship and the upper relationship (for example, a friend or work colleague relationship), but is not limited thereto.

As another example of determining the relationship between the passengers, the processor 402 may check the reservation time and seat number of the passengers for the vehicle in the subscriber list in the memory 403, and based on the check result, determine the relationship between the passengers in the vehicle. For example, when the reservation time of the passengers from the subscriber list is within a predetermined time (30 seconds) and the positions reserved by the passengers are first and second seats (seat numbers 1 and 2) adjacent to each other, the processor 402 may determine the relationship between the passengers seated in the first and second seats as the upper relationship having the highest level of intimacy. In addition, when a relationship with a fellow passenger is detected from the subscriber list, the processor 402 may determine the relationship between the passengers seated in the corresponding seats based on the relationship with the fellow passenger.

The processor 402 may set a certain range as a personal space of a passenger seated in a seat, based on the initially designated position of the seat, and provide corresponding content (for example, video content) in the personal space of the passenger according to the content request of the passenger. Here, the personal space may be a range in which the corresponding seat and the components attached to the seat can move, but is not limited thereto, and may further include a range for providing video content (including subtitles) and audio related to the video content, to the passenger seated in the seat. The video content may be displayed; for example, on the windshield of the vehicle included in the personal space, and the audio may be outputted, for example, through a directional speaker toward each passenger in the vehicle, in a personal space, or may be outputted through wireless or wired earphones owned by the passenger.

For example, in response to the relationship between the passengers being determined as the lower relationship having the lowest level of intimacy, the processor 402 may maintain the personal space of each of the passengers having the lower relationship (i.e., the personal space corresponding to each of the passengers). Here, the processor 402 allows each of the seats in which the passengers having the lower relationship are respectively seated, and the components attached to the seats, to be moved only within the personal space, thereby securing the personal space and thus allowing the passenger not to be disturbed by other passengers. In addition, in response to the relationship between the passengers being determined as the upper relationship having the highest level of intimacy, the processor 402 may combine the personal spaces of each of the passengers having the upper relationship to change the personal spaces into a first shared space. Here, the processor 402 allows each of the seats in which the passengers having the upper relationship are respectively seated, and the components attached to the seats, to be moved only within the first shared space, such that the personal spaces of each other can be shared, thereby allowing the passengers having the upper relationship to feel more comfortable. For example, the processor 402 may extend, to the first shared space, the movement allowance range of a first seat of a first passenger and the components attached to the first seat, and the movement allowance range of a second seat of a second passenger and the components attached to the second seat, the first passenger and the second passenger having the upper relationship. Here, the processor 402 may adjust, in the first shared space, the positions of the first and second seats of the first and second passengers and the inclinations of the backrests attached to the first and second seats in order to allow the backrests to be disposed horizontally with the seats, such that the seats may be used like a bed to provide convenience.

In addition, in response to the relationship between the passengers being determined as the intermediate relationship, the processor 402 may determine a second shared space by overlapping a portion of a personal space of each of the passengers having the intermediate relationship. Here, the processor 402 may extend the movement allowance range of the seats of the passengers having the intermediate relationship and the components attached to the seats, from the personal spaces of the passengers to the second shared space. The processor 402 may allow each of the seats in which the passengers having the intermediate relationship are seated, and the components attached to the seats, to be moved within both the personal spaces of the passengers and the second shared space, thereby providing an environment that allows the passengers to sit as comfortably as possible without causing inconvenience to each other.

In addition, as another example of determining a relationship between passengers, the processor 402 may determine the degree of change (i.e., the degree of movement) in the seat arrangement of the passengers in the vehicle based on information on at least one of video of the inside of the vehicle or sound of the inside of the vehicle, which is collected at predetermined cycles, and re-determine the relationship between the passengers in the vehicle according to the degree of change in the seat arrangement. For example, although the relationship between the passengers seated in adjacent seats has been determined as the lower relationship, the adjacent seats may, while remaining within the personal spaces of the respective passengers, move to be close to each other, such that the separation distance between the seats becomes less than a predetermined distance. In such a case, the processor 402 may re-determine the relationship between the passengers as the intermediate relationship.

In addition, the processor 402 may re-determine the relationship between the passengers at predetermined cycles even after the relationship between the passengers in the vehicle has been determined or may re-determine the relationship between the passengers in the vehicle when the passengers seated in the seats in the vehicle change. Therefore, for example, based on a predetermined relationship criterion (for example, words (appellations) in speech from which a relationship can be inferred, tone (or intonation), gestures related to behavior (for example, physical contact), gaze (for example, eye contact frequency), expression, whether an object is shared, and sitting posture), the processor 402 may re-determine the relationship between the passengers as the intermediate relationship based on changes in conversation or behavior, even when the relationship between those passengers had been previously identified as a stranger relationship, and thus as the lower relationship.

In addition, the processor 402 may control the interior of the vehicle according to a first characteristic regarding the relationship between passengers in the vehicle, but is not limited thereto, and may control the interior of the vehicle, for example, based on a second characteristic regarding a disposition or a state of each of the passengers.

Specifically, the processor 402 may extract situation information from the information on at least one of video of the inside of the vehicle or sound of the inside of the vehicle, which is collected at predetermined cycles, and based on the situation information, determine a disposition (for example, introverted or extroverted) or a state (for example, working, sleeping, or arguing) of each of the passengers whose relationship has been determined, or may determine a disposition or a state of the passengers by applying a situation determination algorithm to the information on at least one of video of the inside of the vehicle or sound of the inside of the vehicle. The processor 402 may adjust any one of the personal space, the first shared space, or the second shared space based on the determination result. Here, the situation information may include, for example, at least one of conversation sound intensity, conversation amount, conversation words, physical contact, gaze, expression, tone, whether an object is shared, or sitting posture (for example, a leaned-back sitting posture in order to sleep). In addition, like the passenger relationship estimation algorithm, the situation determination algorithm may be a neural network model trained to determine a plurality of people' dispositions or states based on the information on at least one of video of the inside of the vehicle or sound of the inside of the vehicle (for example, at least one of motion or conversation sound between the people). The situation determination algorithm may be generated in advance by the apparatus for controlling the interior of the vehicle 400 and pre-stored in the memory 403, or may be provided from the server through a 5G network and received by the interface 401, and stored in the memory 403.

For example, in response to checking that the disposition of the passenger is introverted or the state of the passenger is that he or she is working or sleeping, the processor 402 may adjust the personal space of each of the passengers having the lower relationship to be as small as a predetermined space, or adjust the second shared space of the passengers having the intermediate relationship to be as small as a predetermined space. In addition, in response to checking that the state of the passenger is that he or she is working, sleeping, or having an argument, the processor 402 may adjust the first shared space of the passengers having the upper relationship in order to separate the first shared space into the respective personal spaces of the passengers.

As another example of utilizing a personal space, the processor 402 may provide video content and audio related to the video content in a personal space set for each passenger in the vehicle individually, such that passengers may use different video contents. Accordingly, by utilizing virtually divided spaces in one space in the vehicle personally, each passenger is able to enjoy video content according to his or her individual taste. The video content may be displayed, for example, on the windshield of the vehicle included in the personal space, and the audio may be outputted, for example, through a directional speaker toward each passenger in the vehicle, in a personal space, or may be outputted through wireless or wired earphones owned by the passenger.

Here, in response to the relationship between the passengers being determined as the upper relationship having the highest level of intimacy, or in response to the video content provided in the personal space of each of the passengers being determined to be the same regardless of the relationship between the passengers (or when the relationship between the passengers is not the lower relationship), the processor 402 may combine the personal spaces of each of the passengers to generate a shared space. The processor 402 may extend and provide one video content and audio related to the one video content in the shared space, such that each of the passengers may use the extended video content and the audio together, thereby sharing the emotions that may arise when viewing the video content.

The processor 402 may prevent an item owned by a passenger in a vehicle from being stolen or used by another passenger without the permission of the passenger.

Specifically, the processor 402 may check whether there is a risk of theft of any item, in response to determining that a second passenger other than a first passenger who is the owner of the item is approaching within a predetermined distance of the item, or in response to determining that the item is outside of the personal space of the first passenger (for example, it is determined that the second passenger has acquired the item), based on the information on at least one of video of the inside of the vehicle or sound of the inside of the vehicle, which is collected at predetermined cycles. Here, the processor 402 may identify any item by applying an object identification algorithm to the video of the inside of the vehicle, and identify the first passenger who is the owner of the identified item and the second passenger who is not the owner of the item, by referring to the passenger list. Here, the object identification algorithm may be a neural network model trained to identify an object from video. Like the passenger relationship estimation algorithm, the object identification algorithm may be pre-stored in the memory 403, or may be provided from the server through a 5G network and received by the interface 401, and stored in the memory 403.

Upon checking whether there is a risk of theft of any item, the processor 402 may check whether there is a risk of theft of the item based on the relationship between the first and second passengers and a predetermined item allowance criterion for each relationship. The predetermined item allowance criterion for each relationship may be such that, for example, when the relationship between the first and second passengers is the upper relationship (for example, a couple or family relationship), access to and acquisition of items between each other may be allowed, and when the relationship between the first and second passengers is the lower relationship (for example, a stranger relationship), access to and acquisition of items between each other may not be allowed. In addition, the predetermined allowance criterion may be such that when the relationship between the first and second passengers is the intermediate relationship (for example, a friend or work colleague relationship), access to items between each other may be allowed, but acquisition of items between each other may not be allowed.

Thereafter, in response to checking that there is a risk of theft of the item, the processor 402 may provide a risk warning message for the item to a mobile terminal corresponding to the first passenger. Here, the processor 402 may retrieve the phone number of the mobile terminal corresponding to the first passenger from the subscriber list, and provide the risk warning message for the item to the mobile terminal by using the retrieved phone number of the mobile terminal.

In addition, the processor 402 may provide the risk warning message for the item by generating vibration in the seat of the first passenger who is the owner of the item.

In addition, the processor 402 may provide the risk warning message for the item not only to the first passenger but also to the second passenger.

The memory 403 may store a passenger relationship estimation algorithm, which is a neural network model trained to estimate a relationship between a plurality of people based on information on at least one of motion or conversation sound between the people. The memory 403 may further store a situation determination algorithm, which is a neural network model trained to determine a plurality of people's situations (for example, dispositions or states) from the information on at least one of motion or conversation sound between the people. In addition, the memory 403 may further store an object identification algorithm, which is a neural network model trained to identify an object from video.

The memory 403 may further store at least one of the subscriber list or the passenger list.

The memory 403 may perform a function of temporarily or permanently storing data processed by the processor 402. Here, the memory 403 may include a magnetic storage media or a flash storage media, but the scope of the present disclosure is not limited thereto. The memory 403 may include an embedded memory and/or an external memory and also include a volatile memory such as a DRAM, an SRAM, or an SDRAM; a non-volatile memory such as one time programmable ROM (OTPROM), a PROM, an EPROM, an EEPROM, a mask ROM, a flash ROM, an NAND flash memory, or an NOR flash memory; a flash drive such as an SSD, a compact flash (CF) card, an SD card, a micro-SD card, a mini-SD card, an XD card, or a memory stick; or a storage device such as an HDD.

Figure 5:
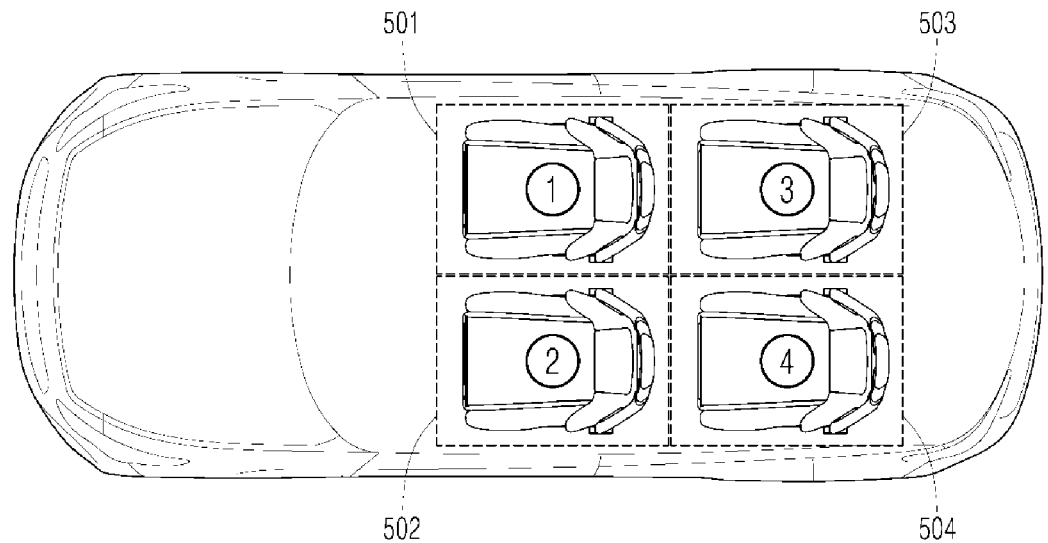
FIGS. 5 to 7 are views for explaining a personal space and first and second shared spaces in an apparatus for controlling an interior of a vehicle according to one embodiment of the present disclosure.
Figure 6:
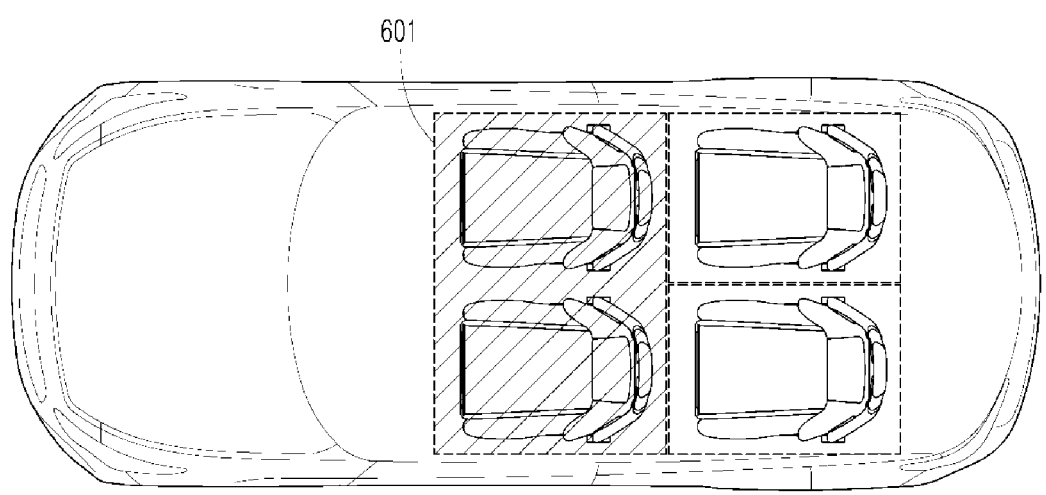
Figure 7:
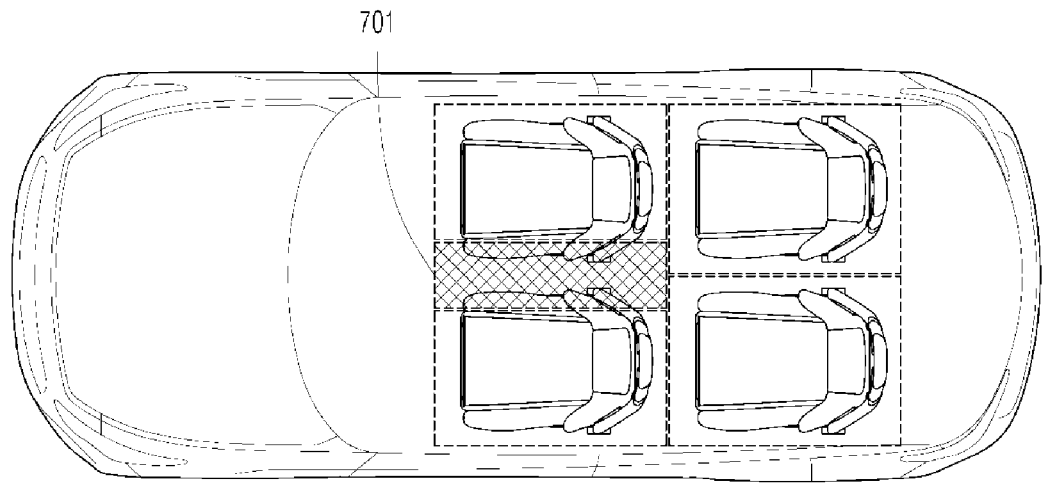

FIGS. 5 to 7 are views for explaining a personal space and first and second shared spaces in an apparatus for controlling an interior of a vehicle according to one embodiment of the present disclosure.

Referring to FIG. 5, an apparatus for controlling an interior of a vehicle may set a certain range as a personal space of a passenger seated in a seat, based on the initially designated position of the seat. Here, the apparatus for controlling the interior of the vehicle may virtually set personal spaces by equally dividing the entire seat space in the vehicle (for example, the range in which all the seats and components attached to the seats can move) according to the number of seats. In FIG. 5, for example, since the number of seats is four, the apparatus for controlling the interior of the vehicle may equally divide and set the entire seat space in the vehicle into four personal spaces, that is, first to fourth personal spaces 501, 502, 503, and 504.

Thereafter, the apparatus for controlling the interior of the vehicle may determine a relationship between passengers seated in the seats of the vehicle, based on the information on at least one of video of the inside of the vehicle or sound of the inside of the vehicle, which is collected at predetermined cycles.

Here, in response to the relationship between the passengers being determined as a lower relationship having the lowest level of intimacy, the apparatus for controlling the interior of the vehicle may maintain a personal space of each of the passengers having the lower relationship. For example, when the relationship between first to fourth passengers seated in the first to fourth seats, respectively, is identified as a "stranger relationship", and the relationship between the first to fourth passengers is thus determined as the lower relationship, the apparatus for controlling the interior of the vehicle may not change the respective first to fourth personal spaces 501, 502, 503, and 504 of the first to fourth passengers, and may maintain the personal spaces as they are or adjust the personal spaces to be as small as a predetermined space, thereby making it possible to widen the distance between unfamiliar passengers to, for example, 1 m or more.

In addition, in response to the relationship between the passengers being determined as an upper relationship having the highest level of intimacy, the apparatus for controlling the interior of the vehicle may combine the personal spaces of each of the passengers having the upper relationship to change the personal spaces into a first shared space. For example, as shown in FIG. 6, when the relationship between the first passenger seated in the first seat and the second passenger seated in the second seat is identified as a "couple relationship", and the relationship between the first and second passengers is thus determined as the upper relationship, the apparatus for controlling the interior of the vehicle may combine the first personal space 501 of the first passenger and the second personal space 502 of the second passenger to change the first and second personal spaces 501 and 502 into a first shared space 601, thereby making it possible to narrow the distance between friendly passengers to, for example, 0.3 m or less. By contrast, in response to the relationship between the third passenger seated the third seat and the fourth passenger seated in the fourth seat being maintained as the lower relationship, which is a "stranger relationship", the apparatus for controlling the interior of the vehicle may maintain the third personal space 503 of the third passenger and the fourth personal space 504 of the fourth passenger seated in the fourth seat.

In addition, in response to the relationship between the passengers being determined as an intermediate relationship other than the lower relationship and the upper relationship, the apparatus for controlling the interior of the vehicle may determine a second shared space by overlapping a portion of the personal space of each of the passengers having the intermediate relationship, and may extend a movement allowance range of seats of the passengers having the intermediate relationship and components attached to the seats, from the personal spaces of the passengers to the second shared space, thereby narrowing the distance between the passengers to, for example, 0.3-1 m. For example, as shown in FIG. 7, when the relationship between the first passenger seated in the first seat and the second passenger seated in the second seat is identified as a "friend relationship", and is thus determined as the intermediate relationship, the apparatus for controlling the interior of the vehicle may determine a second shared space 701 by overlapping a portion of the first personal space 501 of the first passenger and the second personal space 502 of the second passenger, and extend, to the second shared space 701, the movement allowance range of the components attached to the first seat of the first passenger and the components attached to the second seat of the second passenger, the first and second passengers having the intermediate relationship. By contrast, as in FIG. 6, in response to the relationship between the third passenger seated the third seat and the fourth passenger seated in the fourth seat being maintained as the lower relationship which is a "stranger relationship", the apparatus for controlling the interior of the vehicle may maintain the third personal space 503 of the third passenger and the fourth personal space 504 of the fourth passenger seated in the fourth seat.

Figure 8:
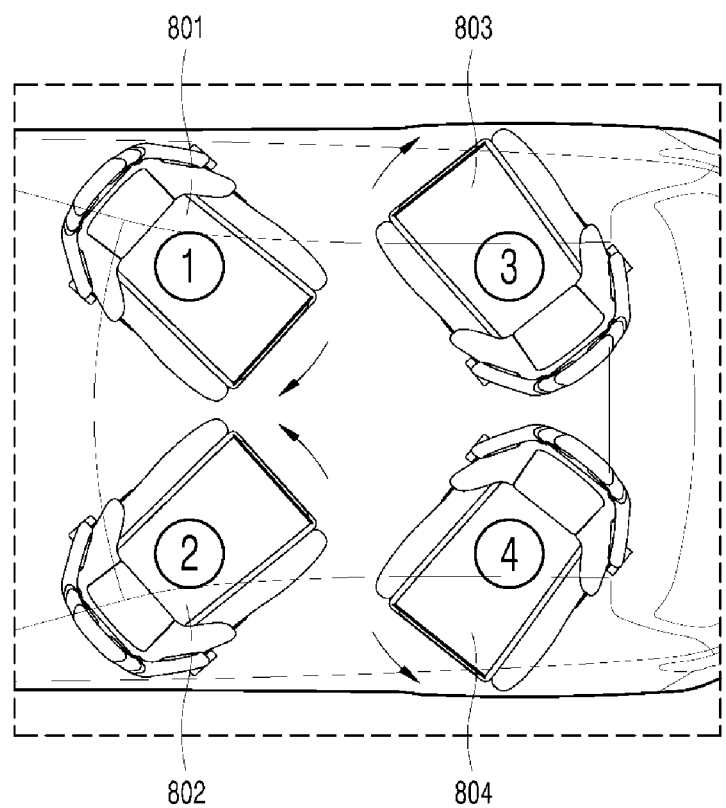
FIG. 8 is a view for explaining an example of controlling an interior in a vehicle, in an apparatus for controlling an interior of a vehicle according to one embodiment of the present disclosure.

FIG. 8 is a view for explaining an example of controlling an interior in a vehicle, in an apparatus for controlling an interior of a vehicle according to one embodiment of the present disclosure.

Referring to FIG. 8, in response to the relationship between the passengers in the vehicle being determined as an upper relationship having the highest level of intimacy, the apparatus for controlling the interior of the vehicle may combine the personal spaces of each of the passengers having the upper relationship to change the personal spaces into a first shared space. Here, the apparatus for controlling the interior of the vehicle may extend, to the first shared space, the movement allowance range of the seats of the passengers having the upper relationship and the components attached to the seats. For example, when the word "mom" is extracted from the sound of the inside of the vehicle, which is collected from the microphone installed in the vehicle, the apparatus for controlling the interior of the vehicle may identify a relationship between a first passenger seated in a first seat 801 and a second passenger seated in a second seat 802 as a "family relationship". In response to the relationship between the first and second passengers being identified as a "family relationship", the apparatus for controlling the interior of the vehicle may determine the relationship between the passengers as the upper relationship, and combine the first personal space of the first passenger and the second personal space of the second passenger to change the first and second personal spaces into a first shared space. Here, the apparatus for controlling the interior of the vehicle may extend, to the first shared space, the movement allowance range of the first seat 801 of the first passenger and the components attached to the first seat 801, and the movement allowance range of the second seat 802 of the second passenger and the components attached to the second seat 802.

For example, the apparatus for controlling the interior of the vehicle may adjust, in the first shared space, the positions of the first and second seats 801, 802 of the first and second passengers and the inclinations of the backrests attached to the first and second seats 801, 802 in order to allow the backrests to be disposed horizontally with the seats, such that the seats may be used like a bed to provide convenience.

In addition, in response to the relationship between the first and the second passengers being determined as the upper relationship, the apparatus for controlling the interior of the vehicle may, in the first shared space, move the positions of the first and second seats 801 and 802 to be as close to each other as possible, and may allow adjustment of the rotation of the first and second seats 801, 802 in a direction in which the first and second seats 801 and 802 face each other.

By contrast, in response to the relationship between the passengers in the vehicle being determined as a lower relationship having the lowest level of intimacy, the apparatus for controlling the interior of the vehicle may maintain the personal space of each of the passengers having the lower relationship. Here, the apparatus for controlling the interior of the vehicle may limit, to the personal space of each passenger, the movement allowance range of the seats of the passengers having the lower relationship and the components attached to the seats. For example, as a result of applying a passenger relationship estimation algorithm to the information on at least one of video of the inside of the vehicle collected by the camera installed in the vehicle or sound of the inside of the vehicle collected from the microphone installed in the vehicle, the apparatus for controlling the interior of the vehicle may identify the relationship between the third passenger seated in the third seat 803 and the fourth passenger seated in the fourth seat 804 as a "stranger relationship". In response to the relationship between the third and fourth passengers being determined as the lower relationship, the apparatus for controlling the interior of the vehicle may limit, to a third personal space, the movement allowance range of the third seat 803 of the third passenger and the components attached to the third seat 803, and may limit, to a fourth personal space, the movement allowance range of the fourth seat 804 of the fourth passenger and the components attached to the fourth seat 804.

Here, in response to the relationship between the third and fourth passengers being determined as the lower relationship, the apparatus for controlling the interior of the vehicle may move the positions of the third and fourth seats 803 and 804 to be as far from each other as possible in the third and fourth personal spaces, respectively, and allow adjustment of the rotation of the third and fourth seats 803 and 804 in a direction in which the third and fourth seats 803 and 804 do not face each other.

Figure 9:
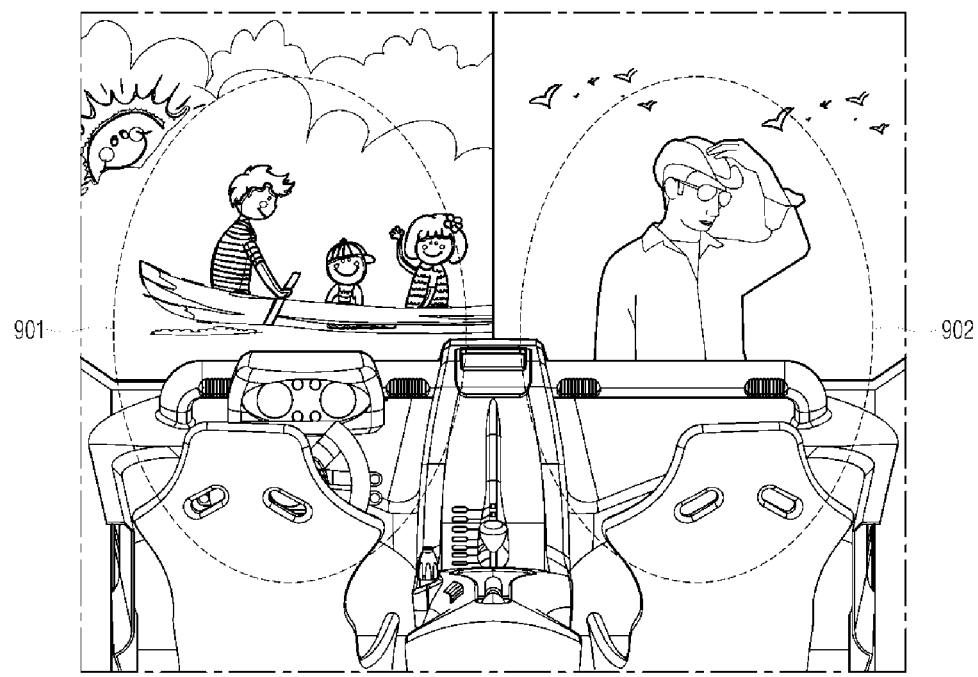
FIGS. 9 and 10 are views for explaining examples of utilizing a personal space and a shared space in a vehicle, in an apparatus for controlling an interior of a vehicle according to one embodiment of the present disclosure.
Figure 10:
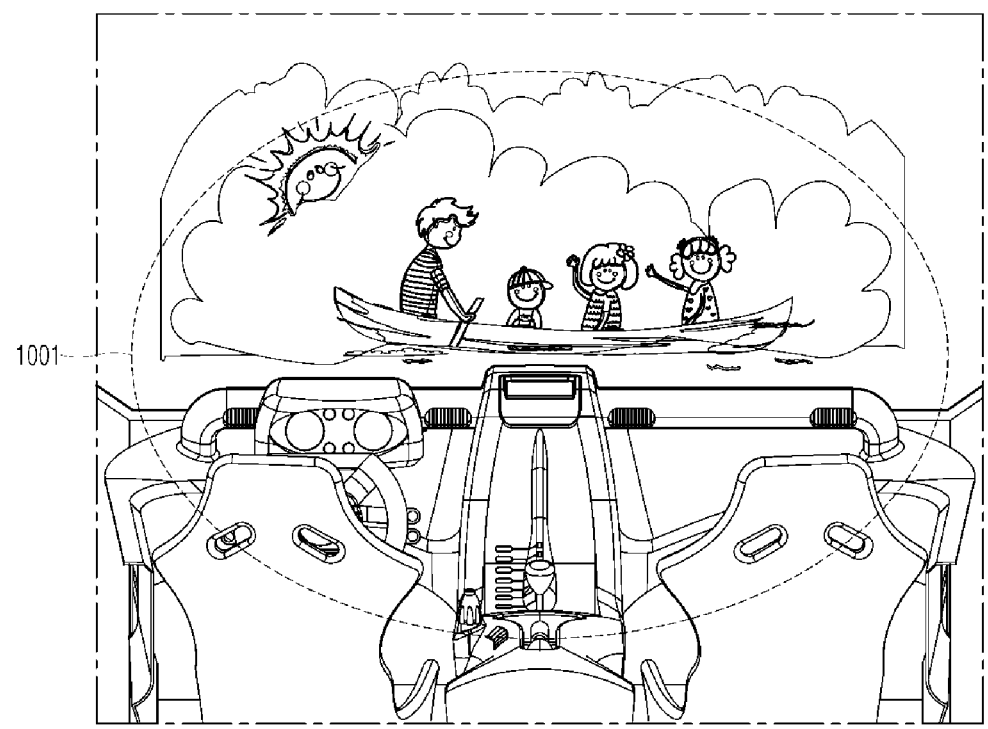

FIGS. 9 and 10 are views for explaining examples of utilizing a personal space and a shared space in a vehicle, in an apparatus for controlling an interior of a vehicle according to one embodiment of the present disclosure.

Referring to FIG. 9, the apparatus for controlling the interior of the vehicle may provide video content and audio related to the video content in the vehicle.

Here, the apparatus for controlling the interior of the vehicle provides the video content and the audio related to the video content in a personal space set for each passenger individually, such that the passengers use different video content. For example, the apparatus for controlling the interior of the vehicle may provide "animation A" and audio related to "animation A" in a first personal space 901 set in a certain range based on the position of a first seat in the vehicle. In addition, the apparatus for controlling the interior of the vehicle may provide "movie B" and audio related to "movie B" in a second personal space 902 set in a certain range based on the position of a second seat in the vehicle.

In addition, in response to the relationship between the passengers in vehicle being determined as an upper relationship having the highest level of intimacy, or in response to the video content provided in the personal space of each of the passengers being determined to be the same regardless of the relationship between the passengers, the apparatus for controlling the interior of the vehicle enables sharing of video content and audio related to the video content between the passengers.

That is, as shown in FIG. 10, the apparatus for controlling the interior of the vehicle generates a shared space 1001 by combining the personal spaces of each of passengers, and in the shared space 1001, extends and provides one video content and audio related to the one video content, such that each of the passengers use the extended video content and the audio together. For example, when the relationship between a first passenger seated in the first seat and a second passenger seated in the second seat is identified as a "family relationship", and is thus determined as the upper relationship, the apparatus for controlling the interior of the vehicle may provide "animation A" and audio related to "animation A" in the shared space 1001. In addition, in response to the video content provided in the personal space of each of the passengers being determined to be the same regardless of the relationship between the first and the second passengers, the apparatus for controlling the interior of the vehicle may provide "animation A" and audio related to "animation A" in the shared space 1001.

By contrast, even if the relationship between the passengers in the vehicle is the upper relationship or the video content provided in each personal space of the passengers is the same, the apparatus for controlling the interior of the vehicle may divide the shared space 1001 into the first personal space 901 and the second personal space 902 according to a separation request of the passenger, and provide the same video content for each personal space individually, such that the playback speed or the subtitle size may be controlled depending on the preference of each passenger.

Figure 11:
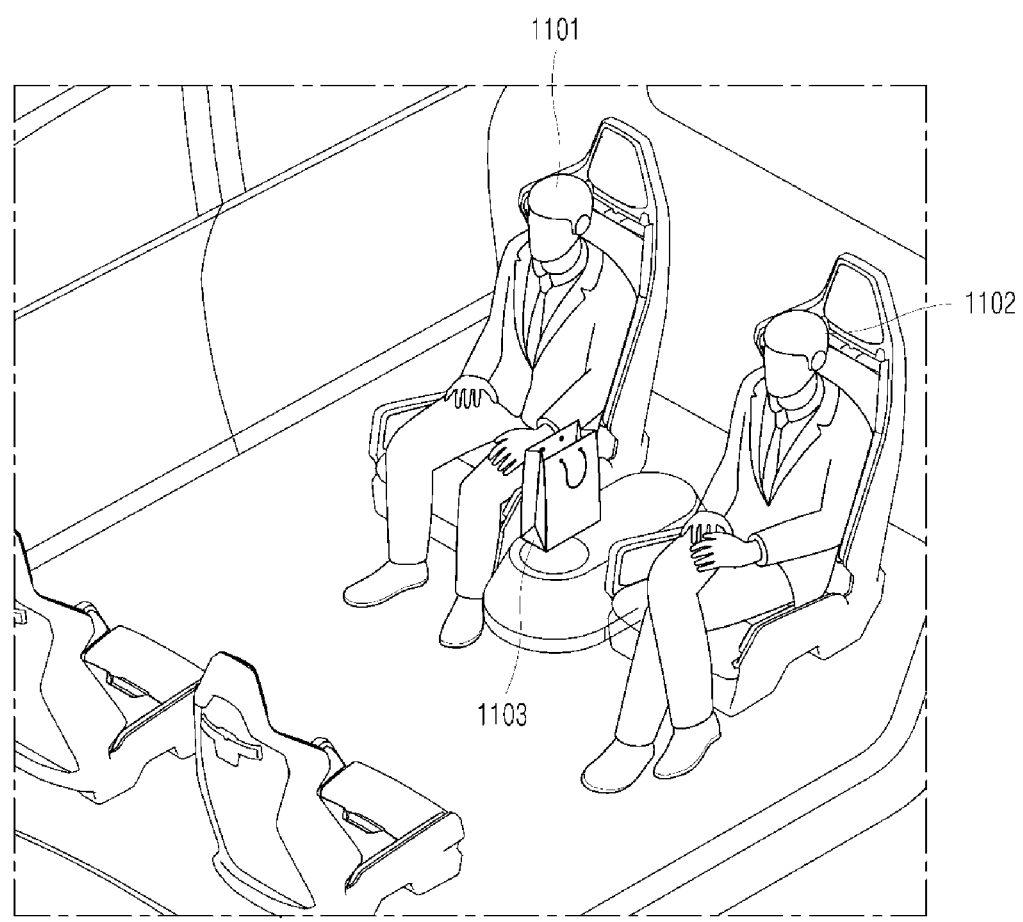
FIG. 11 is a view for explaining an example of preventing theft of an item in a vehicle, in an apparatus for controlling an interior of a vehicle according to one embodiment of the present disclosure.

FIG. 11 is a view for explaining an example of preventing theft of an item in a vehicle, in an apparatus for controlling an interior of a vehicle according to one embodiment of the present disclosure.

Referring to FIG. 11, the apparatus for controlling the interior of the vehicle may keep the items of passengers well regardless of the relationship between the passengers in the vehicle.

Specifically, the apparatus for controlling the interior of the vehicle may check whether there is a risk of theft of any item, in response to determining that a second passenger other than a first passenger who is the owner of the item is approaching within a predetermined distance of the item, or in response to determining that the item is outside of the personal space of the first passenger (for example, it is determined that the second passenger has acquired the item of the first passenger), based on the information on at least one of video of the inside of the vehicle or sound of the inside of the vehicle, which is collected at predetermined cycles. Here, in response to checking that there is a risk of theft of the item, the apparatus for controlling the interior of the vehicle may provide a risk warning message for the item to the mobile terminal corresponding to the first passenger.

The apparatus for controlling the interior of the vehicle may check whether there is a risk of theft of the item, based on a relationship between the first and second passengers and a predetermined allowance criterion (for example, whether to allow access and acquisition for each relationship between the passengers), and may or may not provide a risk warning message for the item according to the check result. The predetermined item allowance criterion for each relationship may be, for example, such that when the relationship between the first and second passengers is an upper relationship (for example, a couple or family relationship), access to and acquisition of items between each other may be allowed, and when the relationship between the first and second passengers is a lower relationship (for example, a stranger relationship), access to and acquisition of items between each other may not be allowed. In addition, the predetermined allowance criterion may be such that when the relationship between the first and second passengers is an intermediate relationship (for example, a friend or work colleague relationship), access to items between each other may be allowed, but acquisition of items between each other may not be allowed.

For example, based on the information on at least one of video of the inside of the vehicle or sound of the inside of the vehicle, which is collected at predetermined cycles, the apparatus for controlling the interior of the vehicle may determine that passenger "B" 1102 is approaching within a predetermined distance of "bag A" 1103 which is the property of passenger "A" 1101, and determine the relationship between passengers "A" and "B" as the lower relationship. Accordingly, in response to checking that there is a risk of theft of "bag A" 1103 based on the predetermined allowance criterion, the apparatus for controlling the interior of the vehicle may provide a warning message for "bag A" 1103 to the mobile terminal of passenger "A".

Figure 12:
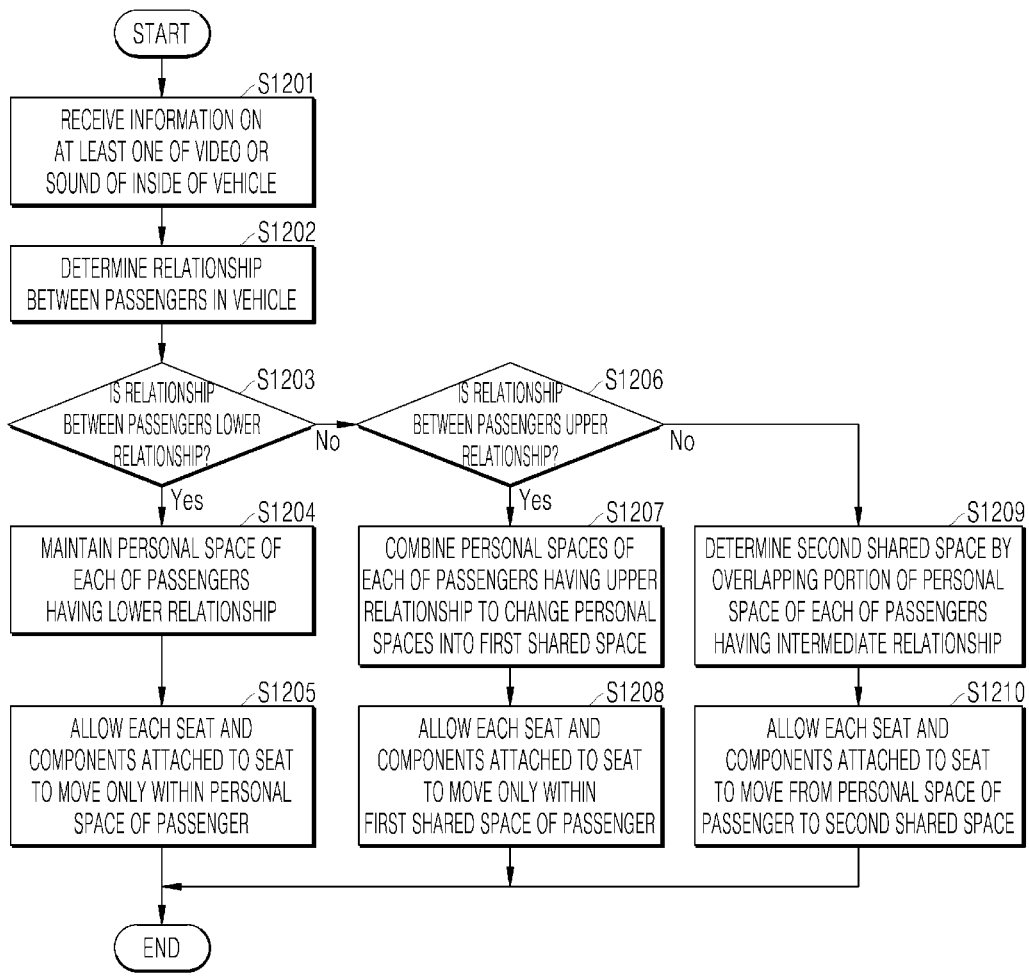
FIG. 12 is a flowchart illustrating a method for controlling an interior of a vehicle according to one embodiment of the present disclosure.

FIG. 12 is a flowchart illustrating a method for controlling an interior of a vehicle according to one embodiment of the present disclosure. Here, an apparatus for controlling an interior of a vehicle, which implements the method for controlling the interior of the vehicle, may generate a passenger relationship estimation algorithm and a situation determination algorithm, and store the same in a memory. The passenger relationship estimation algorithm may be a neural network model trained to estimate a relationship between a plurality of people based on a predetermined relationship criterion, from the information on at least one of motion or conversation sound between the people. In addition, the situation determination algorithm may be a neural network model trained to determine a plurality of people's situations (for example, dispositions or states) from the information on at least one of motion or conversation sound between the people.

Referring to FIG. 12, in step S1201, the apparatus for controlling the interior of the vehicle receives, at predetermined cycles, information on at least one of video of the inside of the vehicle collected by a camera installed in the vehicle or sound of the inside of the vehicle collected from a microphone installed in the vehicle.

In step S1202, the apparatus for controlling the interior of the vehicle may determine a relationship between passengers in the vehicle based on the information received at predetermined cycles. Here, the apparatus for controlling the interior of the vehicle may determine the relationship between the passengers by applying the passenger relationship estimation algorithm to the information on at least one of video of the inside of the vehicle or sound of the inside of the vehicle, or may determine the relationship between the passengers according to the predetermined relationship criterion based on the information. Here, the predetermined relationship criterion may include, for example, words (appellations, such as "mom", "dad", and "honey") in speech from which a relationship can be inferred, tone (or intonation), gestures related to behavior (for example, physical contact), gaze (for example, eye contact frequency), expression, whether an object is shared, and sitting posture.

Thereafter, the apparatus for controlling the interior of the vehicle may control the interior of the vehicle based on the determined relationship between the passengers. Here, the apparatus for controlling the interior of the vehicle may set a certain range as a personal space of a passenger seated in a seat, based on the initially designated position of the seat, maintain a personal space of each passenger or determine a shared space between the passengers by using the personal space based on the relationship between the passengers, and cause the seat and the components attached to the seat to move only within the personal space or the shared space, thereby controlling the interior of the vehicle.

Specifically, in step S1203, the apparatus for controlling the interior of the vehicle may check whether the relationship between the passengers is a lower relationship having the lowest level of intimacy. In response to the relationship between the passengers being determined as the lower relationship, the apparatus for controlling the interior of the vehicle may maintain the personal space of each of the passengers having the lower relationship, in step S1204.

In step S1205, the apparatus for controlling the interior of the vehicle may allow each seat and the components (for example, armrests or backrests) attached to the seat to move only within the personal space of the passenger seated in the seat.

When the relationship between the passengers is not the lower relationship in step S1203, the apparatus for controlling the interior of the vehicle may check whether the relationship between the passengers is an upper relationship having the highest level of intimacy in step S1206. In response to the relationship between the passengers being determined as the upper relationship, the apparatus for controlling the interior of the vehicle may combine the personal spaces of each of the passengers having the upper relationship to change the personal spaces into a first shared space, in step S1207.

In step S1208, the apparatus for controlling the interior of the vehicle may allow each seat and the components attached to the seat to move only within the first shared space of the passenger seated in the seat.

When the relationship between the passengers is not the upper relationship in step S1206, in response to the relationship between the passengers being determined as an intermediate relationship, the apparatus for controlling the interior of the vehicle may determine a second shared space by overlapping a portion of the personal space of each of the passengers having the intermediate relationship, in step S1209.

In step S1210, the apparatus for controlling the interior of the vehicle may allow each seat and the components attached to the seat to extend and move, from the personal space of the passenger seated in the seat to the second shared space.

In addition, the apparatus for controlling the interior of the vehicle may extract situation information from the information on at least one of video of the inside of the vehicle or sound of the inside of the vehicle, which is collected at predetermined cycles, and based on the situation information, determine a disposition (for example, introverted or extroverted) or a state (for example, working, sleeping, or arguing) of each of the passengers whose relationship has been determined, or may determine a disposition or a state of the passengers by applying the situation determination algorithm to the information on at least one of video of the inside of the vehicle or sound of the inside of the vehicle. The apparatus for controlling the interior of the vehicle may adjust any one of the personal space, the first shared space, or the second shared space based on the determination result. Here, the situation information may include, for example, at least one of conversation sound intensity, conversation amount, conversation words, physical contact, gaze, expression, tone, whether an object is shared, or sitting posture. In addition, like the passenger relationship estimation algorithm, the situation determination algorithm may be a neural network model trained to determine a plurality of people' dispositions or states based on the situation information, from information on at least one of motion or conversation sound between the people.

For example, in response to checking that the disposition of the passenger is introverted or the state of the passenger is that he or she is working or sleeping, the apparatus for controlling the interior of the vehicle may adjust the second shared space to be as small as a predetermined space.

In addition, as another example of determining the relationship between the passengers, the apparatus for controlling the interior of the vehicle may determine the degree of change in the seat arrangement of the passengers in the vehicle based on the information on at least one of video of the inside of the vehicle or sound of the inside of the vehicle, which is collected at predetermined cycles, and re-determine the relationship between the passengers in the vehicle according to the degree of change in the seat arrangement.

The apparatus for controlling the interior of the vehicle may first check whether the relationship between the passengers is the lower relationship, and in response to checking that the relationship between the passengers is not the lower relationship, the apparatus may check whether the relationship between the passengers is the upper relationship, but the present disclosure is not limited thereto and the order thereof may be changed.

In addition, the apparatus for controlling the interior of the vehicle provides video content and the audio related to the video content in the personal space set for each passenger in the vehicle individually, such that the passengers use different video content.

Here, in response to the relationship between the passengers being determined as the upper relationship, or in response to the video content provided in the personal space of each of the passengers being determined to be the same regardless of the relationship between the passengers, the apparatus for controlling the interior of the vehicle may combine the personal spaces of each of the passengers to generate a shared space. Thereafter, the apparatus for controlling the interior of the vehicle may extend and provide one video content and audio related to the one video content in the shared space, such that each of the passengers may use the extended video content and the audio together.

As a result, the apparatus for controlling the interior of the vehicle may determine a movement allowance range for at least one of the position of the seat of the passenger, the rotation of the seat, the adjustment of the backrest of the seat, or the adjustment of the armrest of the seat, based on the determined relationship between the passengers. The apparatus may control the interior of the vehicle by adjusting at least one of the seat, the backrest of the seat, or the armrest of the seat based on the movement allowance range.

Figure 13:
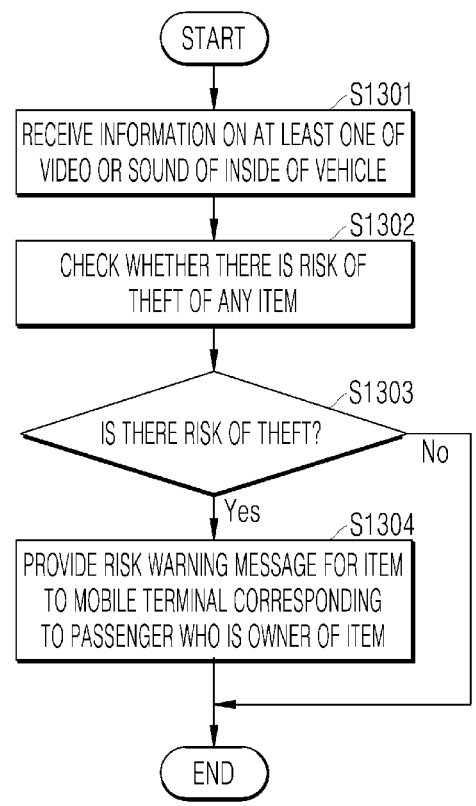
FIG. 13 is a flowchart illustrating a method for preventing theft of an item in a vehicle, in an apparatus for controlling an interior of a vehicle according to one embodiment of the present disclosure.

FIG. 13 is a flowchart illustrating a method for preventing theft of an item in a vehicle, in an apparatus for controlling an interior of a vehicle according to one embodiment of the present disclosure. Here, the apparatus for controlling the interior of the vehicle may, for example, recognize both a passenger and an item owned by the passenger, based on information on at least one of video of the inside of the vehicle or sound of the inside of the vehicle, which is received at predetermined cycles from a camera and a microphone in the vehicle when the vehicle is boarded. Here, the apparatus for controlling the interior of the vehicle may assign a passenger ID and an item ID to the passenger and the item owned by the passenger, respectively, generate a passenger list by matching the assigned passenger ID and the item ID, and store the generated passenger list in a memory.

In addition, when a subscriber list is pre-stored in the memory, the apparatus for controlling the interior of the vehicle may update the passenger list based on the subscriber list.

Referring to FIG. 13, in step S1301, the apparatus for controlling the interior of the vehicle may collect, at predetermined cycles, information on at least one of video of the inside of the vehicle or sound of the inside of the vehicle.

In step S1302, the apparatus for controlling the interior of the vehicle may check whether there is a risk of theft of any item based on the collected information. Specifically, in response to determining that a second passenger other than a first passenger who is the owner of any item is approaching within a predetermined distance of the item, or in response to determining that the item is outside of the personal space of the first passenger, the apparatus for controlling the interior of the vehicle may check whether there is a risk of theft of the item. Here, the apparatus for controlling the interior of the vehicle may identify any item by applying an object identification algorithm in the memory to the information on at least one of video of the inside of the vehicle or the sound of the inside of the vehicle, and identify the first passenger who is the owner of the identified item and the second passenger who is not the owner of the item, by referring to the passenger list.

When checking whether there is a risk of theft of the item, the apparatus for controlling the interior of the vehicle may check whether there is a risk of theft of the item based on the relationship between the first and second passengers and a predetermined item allowance criterion for each relationship. The predetermined item allowance criterion for each relationship may be, for example, such that when the relationship between the first and second passengers is an upper relationship (for example, a couple or family relationship), access to and acquisition of items between each other may be allowed, and when the relationship between the first and second passengers is a lower relationship (for example, a stranger relationship), access to and acquisition of items between each other may not be allowed. In addition, the predetermined allowance criterion may be such that when the relationship between the first and second passengers is an intermediate relationship (for example, a friend or work colleague relationship), access to items between each other may be allowed, but acquisition of items between each other may not be allowed.

In response to checking that there is a risk of theft of any item in step S1303, the apparatus for controlling the interior of the vehicle may provide a risk warning message for the item to the mobile terminal corresponding to the first passenger in step S1304. In addition, the apparatus for controlling the interior of the vehicle may provide the risk warning message for the item by generating vibrations in the seat of the first passenger who is the owner of the item.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. An apparatus for controlling an interior of a vehicle, comprising:
   an interface configured to receive, at predetermined cycles, information on at least one of video of an inside of the vehicle collected by a camera installed in the vehicle or sound of the inside of the vehicle collected from a microphone installed in the vehicle; and
   a processor configured to determine a relationship between passengers in the vehicle based on the information received at the predetermined cycles, and control the interior of the vehicle based on the relationship between the passengers,
   wherein the processor is configured to determine the relationship between the passengers by applying a passenger relationship estimation algorithm to the information on at least one of the video of the inside of the vehicle or the sound of the inside of the vehicle, and
   wherein the passenger relationship estimation algorithm is a neural network model trained to estimate a relationship between a plurality of people from information on at least one of motion or conversation sound between the people, based on at least one of appellations between the people, physical contact, gaze, expression, tone, whether an object is shared, or sitting posture.

2. The apparatus of claim 1, wherein the processor is configured to:
   set a certain range as a personal space of a passenger seated in a seat, based on an initially designated position of the seat;
   in response to the relationship between the passengers being determined as a lower relationship having the lowest level of intimacy based on the information, maintain the personal space of each of the passengers having the lower relationship, and in response to the relationship between the passengers being determined as an upper relationship having the highest level of intimacy based on the information, combine the personal spaces of each of the passengers having the upper relationship to change the personal spaces of each of the passengers having the upper relationship into a first shared space; and
   control the interior of the vehicle by allowing each seat and components attached to the seat to move only within the personal space and the first shared space.

3. The apparatus of claim 2, wherein the processor is configured to:
   in response to the relationship between the passengers being determined as an intermediate relationship other than the lower relationship and the upper relationship, determine a second shared space by overlapping a portion of the personal space of each of the passengers having the intermediate relationship; and
   extend a movement allowance range of seats of the passengers having the intermediate relationship and the components attached to the seats, from the personal space of the passenger to the second shared space.

4. The apparatus of claim 3, wherein the processor is configured to:
   extract situation information from the information on the at least one of the video of the inside of the vehicle or the sound of the inside of the vehicle, which is collected at the predetermined cycles, and based on the situation information, determine a disposition or a state of each of the passengers whose relationship has been determined; and
   adjust any one of the personal space, the first shared space, or the second shared space based on the determination result, and
   wherein the situation information comprises at least one of conversation sound intensity, conversation amount, conversation words, physical contact, gaze, expression, tone, whether an object is shared, or sitting posture.

5. The apparatus of claim 4, wherein the processor is configured to, in response to checking that the disposition of the passenger is introverted or the state of the passenger is that the passenger is working or sleeping, adjust the second shared space to be as small as a predetermined space.

6. The apparatus of claim 2, wherein the processor is configured to provide video content and audio related to the video content in the personal space set for each passenger in the vehicle individually, such that the passengers use different video content.

7. The apparatus of claim 6, wherein the processor is configured to:
   in response to the relationship between the passengers being determined as the upper relationship having the highest level of intimacy, or in response to the video content provided in the personal space of each of the passengers being determined to be the same regardless of the relationship between the passengers, combine the personal spaces of each of the passengers to generate a shared space; and
   extend and provide one video content and audio related to the one video content in the shared space, such that each of the passengers uses the extended video content and the audio together.

8. The apparatus of claim 1, wherein the processor is configured to:
   set a certain range as a personal space of a passenger seated in a seat, based on the initially designated position of the seat;
   check whether there is a risk of theft of any item, in response to determining that a second passenger other than a first passenger who is the owner of the item is approaching within a predetermined distance of the item or in response to determining that the item is outside of the personal space of the first passenger, based on the information on the at least one of the video of the inside of the vehicle or the sound of the inside of the vehicle, which is collected at the predetermined cycles; and
   in response to checking that there is a risk of theft of the item, provide a risk warning message for the item to a mobile terminal corresponding to the first passenger.

9. The apparatus of claim 8, wherein the processor is configured to check whether there is a risk of theft of the item based on the relationship between the first and second passengers and a predetermined item allowance criterion for each relationship.

10. The apparatus of claim 1, wherein the processor is configured to:
   determine a movement allowance range for at least one of the position of the seat of the passenger, rotation of the seat, adjustment of the backrest of the seat, or adjustment of the armrest of the seat, based on the determined relationship between the passengers; and
   control the interior of the vehicle by adjusting at least one of the seat, the backrest of the seat, or the armrest of the seat based on the movement allowance range.

11. The apparatus of claim 1, wherein the processor is configured to determine a degree of change in the seat arrangement of the passengers in the vehicle based on the information on the at least one of the video of the inside of the vehicle or the sound of the inside of the vehicle, which is collected at the predetermined cycles, and re-determine the relationship between the passengers in the vehicle according to the degree of change in the seat arrangement.

12. The apparatus of claim 1, wherein the processor is configured to check a reservation time and seat number of the passengers for the vehicle in a subscriber list, and based on the check result, determine the relationship between the passengers in the vehicle.

13. A method for controlling an interior of a vehicle, comprising:
   receiving, at predetermined cycles, information on at least one of video of an inside of the vehicle collected by a camera installed in the vehicle or sound of the inside of the vehicle collected from a microphone installed in the vehicle;
   determining a relationship between passengers in the vehicle based on the information received at the predetermined cycles, and controlling the interior of the vehicle based on the relationship between the passengers; and
   determining the relationship between the passengers by applying a passenger relationship estimation algorithm to the information on at least one of the video of the inside of the vehicle or the sound of the inside of the vehicle,
   wherein the passenger relationship estimation algorithm is a neural network model trained to estimate a relationship between a plurality of people from information on at least one of motion or conversation sound between the people, based on at least one of appellations between the people, physical contact, gaze, expression, tone, whether an object is shared, or sitting posture.

14. The method of claim 13, further comprising:
   before the controlling the interior of the vehicle, setting a certain range as a personal space of a passenger seated in a seat, based on an initially designated position of the seat,
   wherein the controlling the interior of the vehicle comprises:
   in response to the relationship between the passengers being determined as a lower relationship having the lowest level of intimacy based on the information, maintaining the personal space of each of the passengers having the lower relationship;
   in response to the relationship between the passengers being determined as an upper relationship having the highest level of intimacy based on the information, combining the personal spaces of each of the passengers having the upper relationship to change the personal spaces of each of the passengers having the upper relationship into a first shared space; and
   controlling the interior of the vehicle by allowing each seat and components attached to the seat to move only within the personal space and the first shared space.

15. The method of claim 14, wherein the controlling the interior of the vehicle further comprises:
   in response to the relationship between the passengers being determined as an intermediate relationship other than the lower relationship and the upper relationship, determining a second shared space by overlapping a portion of the personal space of each of the passengers having the intermediate relationship; and
   extending a movement allowance range of seats of the passengers having the intermediate relationship and the components attached to the seats, from the personal spaces of the passengers to the second shared space.

16. The method of claim 15, wherein the controlling the interior of the vehicle further comprises:
   extracting situation information from the information on the at least one of the video of the inside of the vehicle or the sound of the inside of the vehicle, which is collected at the predetermined cycles, and based on the situation information, determining a disposition or a state of each of the passengers whose relationship has been determined, wherein the situation information comprises at least one of conversation sound intensity, conversation amount, conversation words, physical contact, gaze, expression, tone, whether an object is shared, or sitting posture; and
   adjusting any one of the personal space, the first shared space, or the second shared space based on the determination result.

17. The method of claim 14, wherein the controlling the interior of the vehicle comprises providing video content and audio related to the video content in the personal space set for each passenger in the vehicle individually, such that the passengers use different video content.

18. The method of claim 17, wherein the controlling the interior of the vehicle further comprises:
   in response to the relationship between the passengers being determined as the upper relationship having the highest level of intimacy, or in response to the video content provided in the personal space of each of the passengers being determined to be the same regardless of the relationship between the passengers, combining the personal spaces of each of the passengers to generate a shared space; and
   extending and providing one video content and audio related to the one video content in the shared space, such that each of the passengers uses the extended video content and the audio together.

19. The method of claim 13, further comprising:
   before the controlling the interior of the vehicle, setting a certain range as a personal space of a passenger seated in a seat, based on the initially designated position of the seat; and
   after the receiving,
   checking whether there is a risk of theft of any item, in response to determining that a second passenger other than a first passenger who is the owner of the item is approaching within a predetermined distance of the item or in response to determining that the item is outside of the personal space of the first passenger, based on the information on the at least one of the video of the inside of the vehicle or the sound of the inside of the vehicle, which is collected at the predetermined cycles; and in response to checking that there is a risk of theft of the item, providing a risk warning message for the item to a mobile terminal corresponding to the first passenger.

* * * * *